Sept. 25, 1956 J. J. HAGOPIAN 2,764,349
DIFFERENTIAL RING COUNTER
Filed July 28, 1951
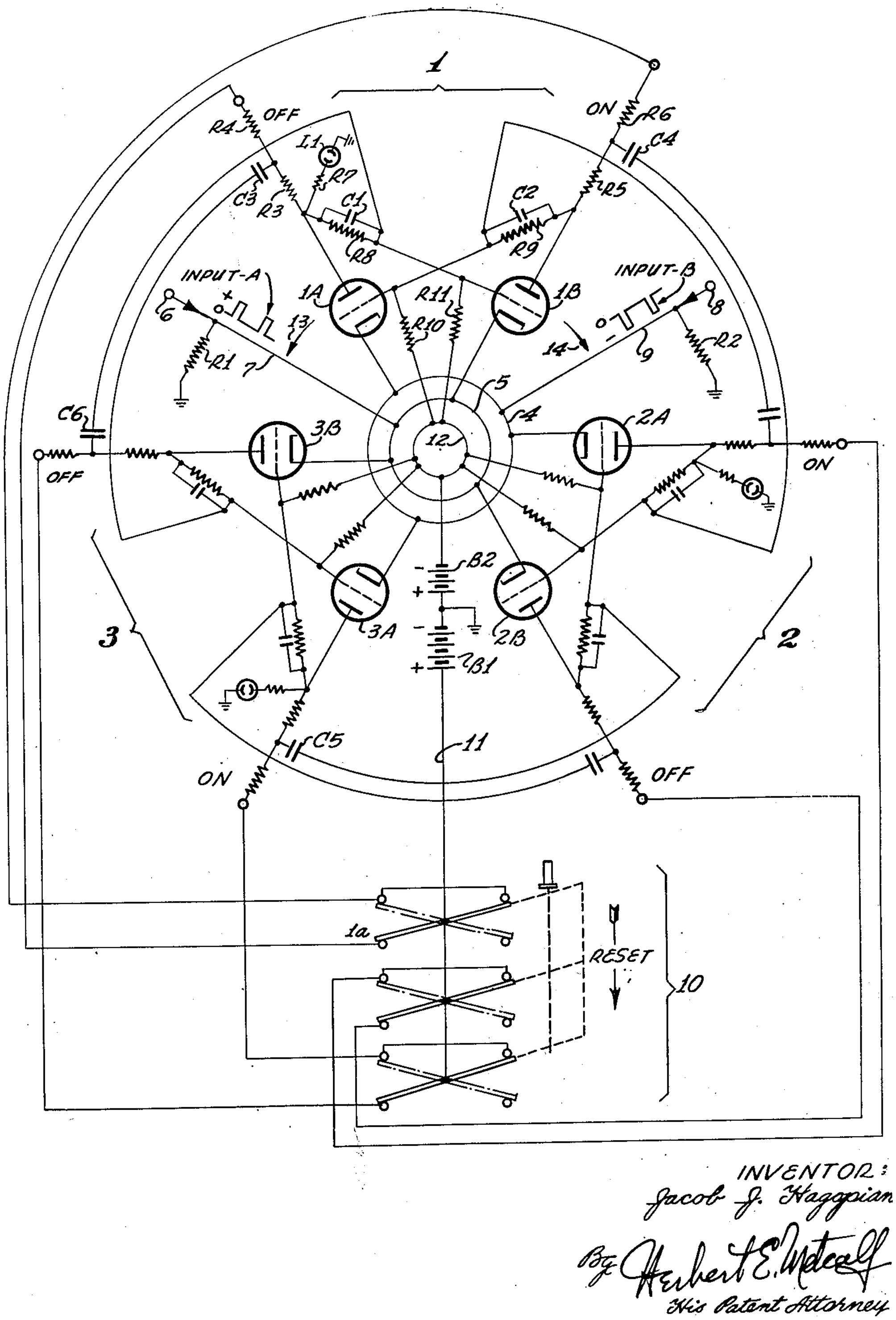
INVENTOR:
Jacob J. Hagopian
By Herbert E. Metcalf
His Patent Attorney United States Patent Office 2,764,349

Patented Sept. 25, 1956

2,764,349

DIFFERENTIAL RING COUNTER

Jacob J. Hagopian, Los Angeles, Calif., assignor to Northrop Aircraft, Inc., Hawthorne, Calif., a corporation of California Application July 28, 1951, Serial No. 239,076

10 Claims. (Cl. 235—92)

The present invention relates generally to ring counters and more particularly to a differential ring counter.

The number of pulses in an electrical pulse stream can be accurately counted and recorded by feeding it into a suitable electronic counter. An electronic counter can count accurately at high speeds because of inherent low inertia. Present high speed electronic counter circuits generally employ elements which have two states of stable operation. The elements can comprise, for example, gas tubes or vacuum tube trigger pairs wherein a tube can only be in either a fully conducting or a completely non-conducting condition; that is, it is either "on" or "off." This type of action is desirable to permit the storage and transmission of information.

The before-mentioned trigger pairs can comprise multivibrator trigger circuits wherein input trigger pulses will cause the trigger circuit to change, for each input pulse, from one stable state to the other. A plurality of the multivibrator counting elements can be connected in series to provide various capacity binary counting systems. By connecting the last stage in a series back to the first stage, a ring counter circuit can be formed. Ring circuits have been generally designed for cumulative counting, and perform in an additive manner only.

It is an object of this invention to provide a differential ring counter circuit which can function as an add-subtract element in, for example, a digital computer.

Another object of the invention will be to provide a circuit which can measure the frequency of a signal with reference to a standard frequency, compare the difference of two unknown frequencies, or compare the phase difference of two signals of the same frequency.

Briefly, the foregoing objects and other objects ancillary thereto are preferably accomplished by providing a series of vacuum tube trigger pairs (counter stages), comprising triodes connected in a "flopover" type multivibrator (bi-stable state) trigger circuit, for example, which trigger elements are suitably connected together in a ring circuit wherein the plate circuit output of one triode section in each stage is connected in a clockwise direction to the grid of the corresponding triode section of the next stage and the other triode sections are similarly connected in series, however, in a counter-clockwise direction. The cathodes of corresponding triode sections of the trigger pairs are connected to common rings, respectively, thereby forming two separate pulse inputs of cathode sets. By placing one of the stages in an abnormal state, stepping the abnormal state in either direction around the ring circuit is produced by providing two separate input pulse trains of different polarity derived from two input signals and which are applied respectively to the two cathode sets. Circuit components are chosen such that the input pulses are larger in magnitude than the transfer pulses between stages but are smaller than the amplified pulses within a stage. A differential ring counter circuit can thus be produced.

The invention possesses other objects and features, some of which, together with the foregoing, will be set forth in the following description of a preferred embodiment of the invention, and the invention will be more fully understood be reference to the accompanying drawing, in which the single figure shows, as an example only of this invention, a schematic circuit diagram illustrating the connections and components used for a differential ring counter circuit in accordance with this invention.

Referring to the single figure, three trigger stages 1, 2 and 3 are shown; however, as many stages as required can be used. Each of the stages comprises a "flopover" type multivibrator trigger circuit with separate pulse inputs to the two cathodes. Counter stage 1 consists of two identical triodes 1A and 1B suitably interconnected. The cathode of triode 1A is connected to an input ring 4 and the cathode of triode 1B is connected to another input ring 5. Input terminal 6 is connected to the input ring 5 by means of input lead 7 across which is connected an input and cathode return resistance R1 to ground. Similarly, input terminal 8 is connected to the input ring 4 by input lead 9 across which is connected another input and cathode return resistance R2 to ground.

The plate of triode 1A is connected to terminal 1*a* of a plate voltage supply distributing switch 10 by two resistances R3 and R4 in series and the plate of triode 1B is similarly connected to plate voltage supply switch 10 through series resistances R5 and R6. The positive terminal of a plate supply D. C. voltage source B1 is connected to supply switch 10 by means of supply lead 11. In the normal position of supply switch 10, shown by solid lines, the plate circuits of all triodes are connected to the source B1. An indicating lamp as a neon diode L1 can be connected to the plate of triode 1A through a large limiting resistance R7.

The two triodes of a trigger pair are suitably interconnected by connecting the grid of one to the plate of the other. The plate of triode 1A is connected to the grid of triode 1B by means of resistance R8 and similarly R9 connects the plate of triode 1B to the grid of triode 1A. Shunting capacitance C1 connected across the resistance R8 and capacitance C2 connected across the resistance R9 provide for high speed operation of the circuit. A resistance R10 connects the grid of triode 1A to a grid bias supply ring 12, and resistance R11 is used to connect the grid of triode 1B to the same supply ring 12. The ring 12 is connected to the negative terminal of a D. C. voltage source B2 which provides grid bias voltage for all the tubes.

A series connection of trigger stages in two directions is provided where the plate circuit output of one triode of each stage is connected to the grid of a corresponding triode in the next succeeding stage in a counter-clockwise direction, for example, and the plate circuit output of the other triode of the pair of each stage is connected to the grid of a corresponding triode in the next stage in a clockwise direction. Capacitance C3 is connected to the junction between series resistances R3 and R4 in the plate circuit of triode 1A and couples with the grid of triode 3A in a counter-clockwise direction, and capacitance C4 is similarly connected to the junction between series resistances R5 and R6 in the plate circuit of triode 1B and the grid of triode 2B in a clockwise direction. The connection between the two series plate circuit resistances provides for the smaller interstage transfer pulses than the amplified pulses within a stage since the change in potential at the junction is smaller than at the plate of a triode when the tube is turned "off."

Trigger stages 2 and 3 are identical to stage 1 with respect to both components and connections and need not be further described.

Operation of the circuit is as follows. First, consider the normal state of a trigger stage as being such that the A tube is "on" and the B tube is "off." Then by operating simple auxiliary means such as for example the triple pole push button switch 10 connected to momentarily remove the B1 plate supply voltage from all the B tubes except trigger stage 1 where it is removed from the A tube plate, one of the trigger stages can thus be initially placed in the abnormal state, as indicated in the accompanying figure, by the words "on" and "off." Therefore, in stage 1, the A tube is now "off" and the B tube is "on," while all other stages are in the so-called normal state, having their A tubes "on" and their B tubes "off."

If, now, with a positive pulse train input A alone applied at input terminal 6 to the differential ring counter, the first pulse will place trigger stage 1 in the normal state, i. e. turn tube 1B "off" by raising the potential of the cathode of tube 1B and utilizing the consequent rise in plate potential of tube 1B applied to the grid of tube 1A through the parallel combination of resistance R9 and capacitance C2 to turn the tube 1A "on." The resulting subsequent drop in plate potential of tube 1A is applied back to the grid of tube 1B by the parallel combination of resistance R8 and capacitance C1 to further turn "off" tube 1B. The effect is cumulative and the tube 1A is finally fully "on" and tube 1B is completely "off." Simultaneously, this stage generates the following interstage transfer pulses: (*a*) A positive pulse derived from the plate circuit of tube 1B is applied to the grid of tube 2B by means of the capacitance C4. This does not trigger stage 2 because the cathode of tube 2B also receives the positive input pulse of pulse train A which is larger in magnitude than the interstage transfer pulse and is of adequate pulse width. (*b*) A second interstage transfer pulse generated is a negative pulse derived from the plate circuit of tube 1A and it is applied to the grid of tube 3A through the capacitance C3. This pulse does trigger stage 3 and places it in the abnormal state by turning tube 3A "off" and tube 3B "on." The larger amplified pulse within stage 3 provided at the grid of tube 3B by the rise of plate potential of tube 3A has more effect than the smaller positive input pulse to the cathode of tube 3B and assumes control.

Concomitant with the triggering of stage 3 are generated additional interstage transfer pulses. A positive pulse taken from the plate circuit of tube 3A is applied to the grid of tube 2A through capacitance C5. This has no effect since the tube 2A is already "on." Another pulse, which is negative, is generated from the plate circuit of tube 3B and it is directed to the grid of tube 1B through capacitance C6. This pulse merely assists the positive input pulse of train A to the cathode to turn tube 1B "off." Thus, each pulse of input train A shifts the abnormal state of a trigger stage counter-clockwise indicated by the small arrow 13.

Consider next that only negative pulse train input B is applied at the input terminal 8. Through an exactly similar action just described above, each pulse of input train B will shift the abnormal state one stage in the clockwise direction indicated by the small arrow 14.

When both pulse train inputs A and B are present, the net rotation (count) of the abnormal state will depend upon the relative rates of the pulse train A and pulse train B inputs. Only one trigger stage will be in the abnormal state at any instant when proper choice of components is made.

Indicating means, as a neon diode L1 or similar device, can be connected between each A tube plate and ground, for example. This can afford a visual indicator which is utilized in any judicious manner, since a light on indicates that its stage is in the abnormal state. For example, the rate of pulse input at input terminal 6 is known to be greater than that at input terminal 8 when the observed resultant direction of rotation of the light is in the counterclockwise direction. When they are of an identical rate and are in phase, the abnormal stage remains stationary. Thus, when the frequency of one input is known, the rate of movement (as measured by a stroboscope, for example) and the direction of rotation can give the unknown frequency. However, when the frequencies to the two inputs are the same although of different phase, the indicating lamps can flash, say, clockwise forward to the next stage, then counter-clockwise back to the former stage, in a back and forward oscillating pattern. It is apparent that the time lapse difference between flashes in a forward direction and flashes in a rearward direction can give the phase difference of the two pulse trains. It is understood the absolute magnitude of the pulses of both input trains are, of course, at least nearly the same.

It should be understood that the aforesaid bi-stable state trigger circuits are not limited only to vacuum tube trigger pairs and can also be comprised for example, of gas tubes, saturable core reactor trigger elements, and the like.

From the foregoing discussion it is immediately evident that the differential counter can be of direct application in any of many existing digital computers as an add-subtract element. In this event, the neon indicators can be dispensed with, if desired.

While in order to comply with the statue, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. An electronic differential ring counter comprising a plurality of bi-stable trigger stages, each said trigger stage having two separate external output producing circuits and a separate trigger input connection to each of the two sides of each stage, said trigger stages arranged in a ring with one output of each connected to an adjacent stage in a clockwise direction to normally trigger said adjacent stage when the previous stage is triggered, and the other output of each stage similarly connected to an adjacent stage in a counterclockwise direction, a first external input terminal for conducting positive input pulses and a second external input terminal for conducting negative input pulses, said first terminal connected to the trigger inputs on one side of each stage, said second terminal connected to the trigger inputs on the other side of each stage, input pulses on each of said terminals being of the proper polarity to prevent said normal adjacent stage-triggering in alternate directions, respectively, and means in said output circuits for reducing the amplitude of output pulses transferred between stages substantially lower than the inherently generated pulses within a stage during transition from one stable state to the other, whereby non-simultaneous external input pulses, of an amplitude between that of said interstage transfer pulses and said stage-generated pulses, applied as recited to said input terminals, can be differentially counted by the resulting direction of stage triggering around said ring.

2. In a ring counting circuit, at least three stages of two-sided bi-stable electronic trigger circuits, first means connecting the output of one side of each stage to an input of its corresponding side in the adjacent stage in a clockwise direction, second means similarly connecting the output of the other side of each stage to an input of its corresponding side in the opposite adjacent stage in the counterclockwise direction, a trigger input of one side of each stage connected to a corresponding side trigger input in all other stages and to a first input lead, and a trigger input of the other side of each stage connected to the corresponding side trigger input of all other stages and to a second input lead.

3. Apparatus in accordance with claim 2 including means for initially setting one of said stages in a predetermined abnormal state and all remaining stages in the normal state, whereby a positive pulse on said first input lead is used to shift the abnormal stage to the adjacent stage in one direction, only, around said ring circuit, and a negative pulse on said second input lead is used to shift the abnormal stage to the adjacent stage in the other direction.

4. Apparatus in accordance with claim 2 wherein one of said stages is initially in a predetermined abnormal state and all other stages are initially in the normal state, and including indicating means connected to each stage to indicate the state.

5. Apparatus in accordance with claim 2 wherein said first and second connecting means include a voltage-dropping resistance and a coupling capacity between each said output and the following input, whereby interstage transfer pulses through said connecting means are made smaller than input pulses on said input leads to prevent triggering of a stage side where both an interstage transfer pulse and an input pulse on said trigger input are simultaneously applied to that side.

6. Apparatus in accordance with claim 2, including a neon diode connected to one output of each stage for indicating the state of said stages at all times.

7. Apparatus in accordance with claim 2 wherein a positive operating voltage is supplied to all stage sides through a multiple-element resetting switch, said switch wired to momentarily remove said operating voltage from a first corresponding side of all stages except one, and to momentarily remove said operating voltage from the second side of said one stage, whereby said ring circuit may be initially set at a starting position where said one stage is in an abnormal state compared to the remaining stages.

8. A differential ring counter comprising at least three counting stages arranged in a ring, each stage comprising a pair of triode vacuum tubes interconnected in a bi-stable flip-flop circuit, the anode of one tube of each stage connected through a voltage-dropping resistor and a capacitor to the grid of its corresponding tube in the adjacent stage in a clockwise direction, the anode of the other tube of each stage similarly connected to the grid of its corresponding tube in a counterclockwise direction, the cathode of one tube of each stage directly connected to the cathode of its corresponding tube in all other stages and to a first input line, and the cathode of the other tube in each stage directly connected to the cathode of its corresponding tube in all other stages and to a second input line.

9. Apparatus in accordance with claim 8 including a neon diode and a protective resistance connected in series to the anode circuit of single corresponding triodes in each stage to indicate the state of each stage.

10. Apparatus in accordance with claim 8 including a multiple-element resetting switch connected in the anode supply circuit of each said tube, said switch wired to disconnect anode operating voltage from a first corresponding tube of all stages except one, when said switch is momentarily operated, and to simultaneously disconnect anode operating voltage from the other, non-corresponding tube of said one stage, whereby said ring counter may be initially set at a starting position where said one stage is in an abnormal state with respect to the remaining stages.

References Cited in the file of this patent

UNITED STATES PATENTS

| | | |
|---|---|---|
| 2,306,386 | Hollywood | Dec. 29, 1942 |
| 2,409,689 | Morton et al. | Oct. 22, 1946 |
| 2,428,990 | Rajchman | Oct. 14, 1947 |
| 2,462,275 | Morton et al. | Feb. 22, 1949 |
| 2,534,287 | Marsh | Dec. 19, 1950 |
| 2,537,427 | Seid | Jan. 9, 1951 |
| 2,583,102 | Holden | Jan. 22, 1952 |

OTHER REFERENCES

"Reversible Decade Counting Circuit," Regener, October 1946; The Review of Scientific Instruments, pp. 375–376.